US008442552B2

(12) United States Patent
Gallegos (10) Patent No.: US 8,442,552 B2
(45) Date of Patent: May 14, 2013

(54) METHOD AND SYSTEM FOR RADIO FREQUENCY COVERAGE PREDICTION IN A MULTI-LEVEL WIRELESS NETWORK

(75) Inventor: Fabiel Zuniga Gallegos, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 489 days.

(21) Appl. No.: 12/766,520

(22) Filed: Apr. 23, 2010

(65) Prior Publication Data
US 2011/0263277 A1    Oct. 27, 2011

(51) Int. Cl.
*H04W 24/00*    (2009.01)
(52) U.S. Cl.
USPC .................. 455/456.1; 455/404.2; 455/3.1
(58) Field of Classification Search .............. 455/3.1, 455/9, 67.1, 67.11, 115, 115.1, 404.2, 456, 455/456.1
See application file for complete search history.

(56) References Cited

U.S. PATENT DOCUMENTS

| | | | | |
|---|---|---|---|---|
| 5,450,615 | A * | 9/1995 | Fortune et al. | 455/67.16 |
| 7,274,332 | B1 * | 9/2007 | Dupray | 342/450 |
| 7,539,495 | B2 | 5/2009 | Kalika et al. | |
| 2002/0058503 | A1 * | 5/2002 | Gutowski | 455/423 |
| 2005/0043933 | A1 * | 2/2005 | Rappaport et al. | 703/1 |
| 2007/0054670 | A1 | 3/2007 | Kalika et al. | |
| 2008/0166973 | A1 | 7/2008 | Hart et al. | |
| 2008/0280565 | A1 * | 11/2008 | Jevremovic et al. | 455/67.7 |
| 2009/0037149 | A1 | 2/2009 | Vitek | |
| 2009/0047916 | A1 * | 2/2009 | Haykin | 455/115.1 |
| 2009/0063121 | A1 | 3/2009 | Vangati | |
| 2009/0280835 | A1 * | 11/2009 | Males et al. | 455/456.5 |

OTHER PUBLICATIONS

Roger R. Skidmore, Theodore S. Rappaport, and A. Lynn Abbott; "Interactive Coverage Region and System Design Simulation for Wireless Communication Systems in Multifloored Indoor Environments"; Intellevate (India) Pvt Ltd (3rd Site). Downloaded on Apr. 5, 2010.
P. Prasithsangaree1, P. Krishnamurthy1, P.K. Chrysanthis; "On Indoor Position Location With Wireless LANs" PIMRC 2002; 0-7803-7589-0/02/$17.00 © 2002 IEEE.

* cited by examiner

*Primary Examiner* — Kamran Afshar
*Assistant Examiner* — Marisol Fahnert (57) ABSTRACT

A method and system for predicting radio frequency (RF) coverage in a multi-level wireless network is described herein. The multi-level wireless network includes the network management server and a plurality of wireless devices, where each of the wireless devices includes an RF transmitter. A two-dimensional wireless network configuration model of a vertical level of the multi-level wireless network is determined. A path loss in a propagation path of an RF signal from an RF transmitter of a wireless device to a grid point in the vertical level is determined. The path loss may be based on a plurality of path loss exponents. A signal strength loss due to one or more obstacles that intersect the propagation path is determined. A strength of the RF signal is predicted based on the path loss and the signal strength loss.

19 Claims, 9 Drawing Sheets

METHOD AND SYSTEM FOR RADIO FREQUENCY COVERAGE PREDICTION IN A MULTI-LEVEL WIRELESS NETWORK

I. BACKGROUND

Radio frequency (RF) devices such as network switches, wireless access points, ports and radio frequency identification (RFID) systems are becoming more commonplace in today's society with the market adoption of wireless local area network (WLAN) technologies. One criterion for the design of a WLAN network using RF devices is the RF coverage area for each device. In a typical design, the collective RF coverage areas of the RF devices facilitate effective communication by client devices. It is well understood that RF waves are susceptible to signal loss when passing through various physical and environmental factors. For example, the presence of doors, windows, walls, furniture, and shelving, are obstacles to the RF signal.

RF coverage maps provide graphical information about the coverage of various RF devices. RF coverage maps are useful for assessing the area for sufficient WLAN service and are typically derived from manual site surveys and mathematical modeling techniques. Some methods generate RF coverage maps based on received signal strength values associated with transmission signals exchanged between a wireless node and one or more wireless access points. Received signal strength values may be obtained at various locations to generate a coverage map for the wireless access points.

RF coverage maps may also be generated by estimation algorithms using, for example, path-loss models and ray tracing, in which RF devices are layered onto a plane. Two-dimensional models in the RF coverage maps may be floor-specific, providing visualizations of the coverage by RF devices that are physically placed on the floor being modeled. In many WLAN deployments, such as in a multi-floor building, the signal coverage may have presence beyond the floor boundaries, thereby making accurate coverage maps difficult to produce. Three-dimensional (3D) coverage maps may be more accurate but are computationally expensive.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Radio frequency (RF) coverage maps for WLAN deployments using two-dimensional (2D) coverage models may be used to depict WLAN deployments for a wireless environment, such as a multi-level building or other structure. As used herein, a wireless environment is a space, whether indoor and/or outdoor, where wireless connectivity is provided. The wireless environment may include a multi-level building or other multi-level physical structure, whether man-made and/or naturally occurring, a retail store, a home, a warehouse, and the like. A coverage area is an area where wireless connectivity is provided. A coverage map for a wireless network environment represents an approximated RF coverage area of one or more wireless devices. As used herein a wireless device is a network device having wireless capability and including a radio frequency transmitter.

Efficient and accurate coverage maps take into account the multi-directional propagation path of radio waves in a coverage model. Slices of a 3D signal coverage space are determined, where each slice represents the signal coverage at a vertical level of the wireless environment. The slices are represented as 2D models and used to perform RF projections. As such, RF projections predict the influence of all RF transmitters (or a subset thereof) across a wireless environment, including those RF transmitters which are physically located in a level remote to the level being modeled. This may be accomplished without the creation of 3D models. From a signal coverage analysis point of view it is not worth the computational expense to model the 3D signal coverage space. Rather, it is more efficient and practical to model the signal coverage in a 2D plane of a floor or level, which is the space most occupied by end users.

A method and system for predicting radio frequency coverage in a multi-level wireless network is described herein. The multi-level wireless network includes the network management server and a plurality of wireless devices, where each of the wireless devices includes an RF transmitter. A two-dimensional wireless network configuration model of a vertical level of the multi-level wireless network is determined. A path loss in a propagation path of an RF signal from the RF transmitter to a grid point in the vertical level of is determined. The path loss may be based on a plurality of path loss exponents. A signal strength loss due to one or more obstacles that intersect the propagation path is determined. A strength of the RF signal is predicted based on the path loss and the signal strength loss.

Figure 1:
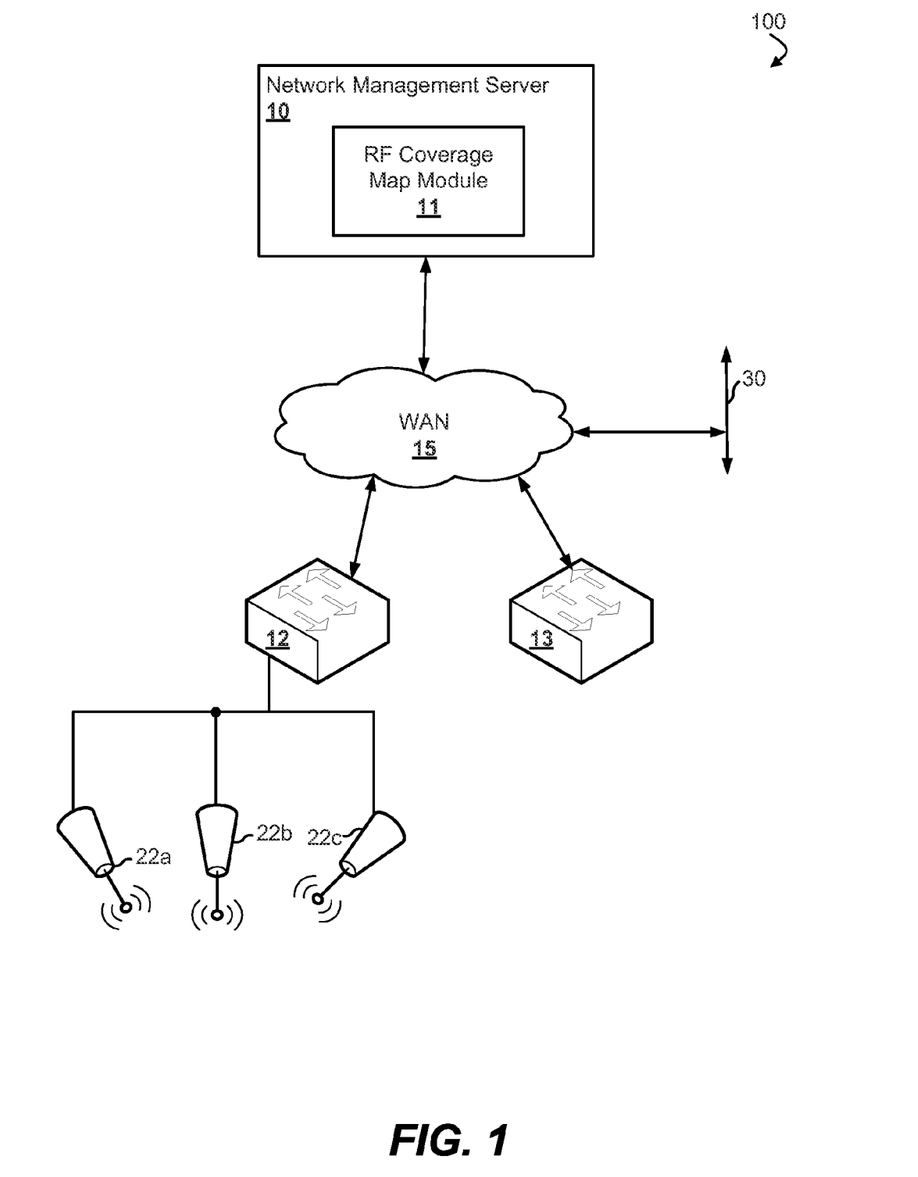
FIG. 1 is a topological block diagram of a network system in accordance with an embodiment of the invention.

FIG. 1 is a topological block diagram of a network system 100 in accordance with an embodiment of the invention. System 100 includes a network management server 10, wide area network (WAN) 15, a network switch 12, a network switch 13, a local area network (LAN) 30, and wireless access points 22a-22c.

Network management server 10 is configured to manage, monitor, and/or deploy a network. Network management server 10 is operatively coupled to network switch 12 and network switch 13 via WAN 15. The connection between network management server 10 and network switches 12-13 may include multiple network segments, transmission technologies and components. Network management server 10 includes RF coverage map module 1 which is configured to determine a predicted signal strength of an RF transmitter of a wireless device considering the multi-directional propagation path of radio waves emanating from the RF transmitter. RF coverage map module is further configured to generate an RF coverage map for a vertical level of a wireless environment based on the predicted signal strength.

LAN 30 is operatively coupled to WAN 15. LAN 30 is implemented by one or more network switches and/or other network devices, such as a bridge. LAN 30 may be a LAN, LAN segments implemented by an Ethernet switch or an array of switches having multiple ports.

Network switch 12 is operatively coupled to network management server 10 via WAN 15. Network switch 12 includes multiple ports, one or more of which connects to wireless access points 22a-22c. Network switch 12 is an edge device. As used herein, an edge device is a network switch, router, or other network device on the edge of a network. Host devices connect directly to the edge device via an edge port. As used herein, an edge port is a port of an edge device. In one embodiment, wireless access points 22a-22c are connected to network switch 12 via an edge port of network switch 12.

Network switch 13 is operatively coupled to network management server 10 via WAN 15. Network switch 13 includes multiple ports.

In operation, wireless devices, such as network switch 12, network switch 13, and/or wireless access points 22a-22c, may be located in various vertical levels of a wireless environment. For example, network switch 12 and wireless access point 22a may be located in a first floor of a building, wireless access point 22b may be located in a second floor of the building, and network switch 13 and wireless access point 22c may be located in a third floor of the building. The signal coverage of wireless access point 22a and wireless access point 22b may propagate to floor three of the building. RF coverage map module 1 may generate an RF coverage map of floor three including a graphical representation of coverage provided on floor three by the wireless devices of the building. For example, the RF coverage map for floor three may include graphical representations of the coverage provided by wireless access point 22a and wireless access point 22b at floor three, notwithstanding that wireless access point 22a and wireless access point 22b are physically located on floors other than floor three.

The present invention can also be applied in other network topologies and environments. Network system 100 may be any type of network familiar to those skilled in the art that can support data communications using any of a variety of commercially-available protocols, including without limitation TCP/IP, SNA, IPX, AppleTalk, and the like. Merely by way of example, network system 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
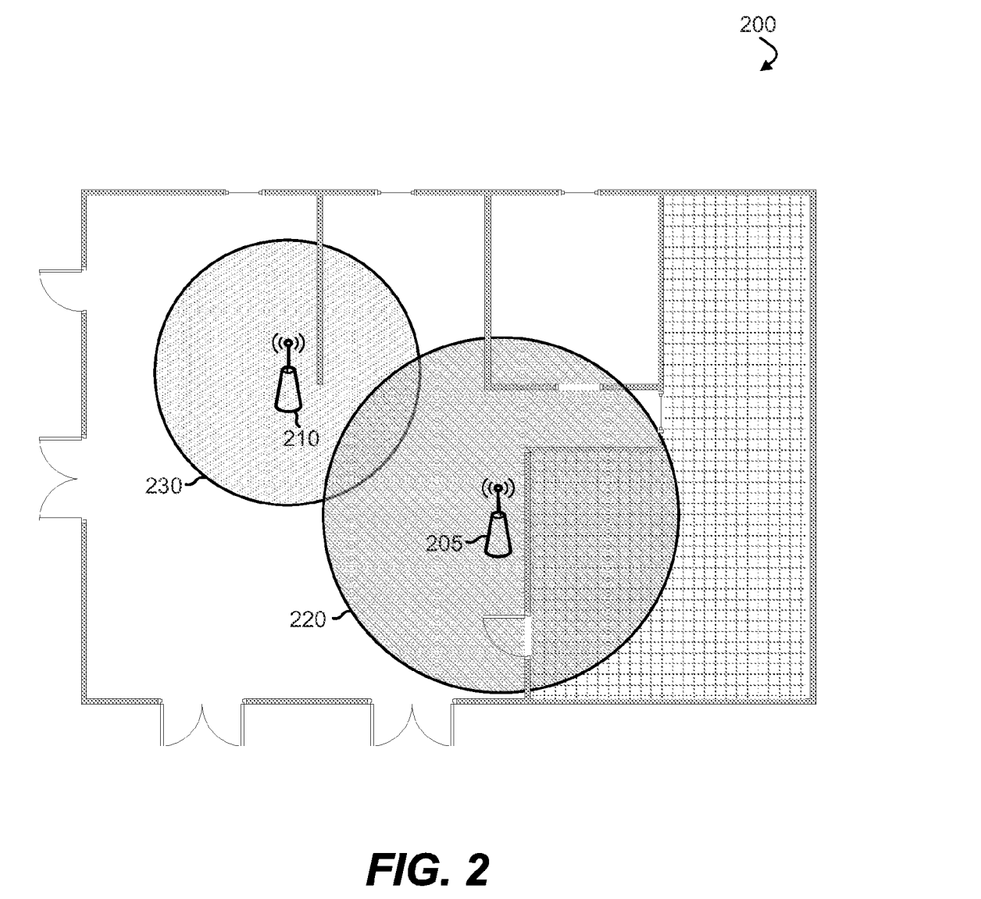
FIG. 2 is an exemplary physical space and radio frequency coverage map in accordance with an embodiment of the invention.

FIG. 2 is an exemplary physical space and radio frequency coverage map 200 in accordance with an embodiment of the invention. Coverage map 200 includes a floor plan or a physical layout plan of a vertical layer (e.g., floor) in a wireless environment (e.g., building). In one embodiment, coverage map 200 represents floor two in an office building comprising five floors. The floor plan may be divided into multiple grid blocks and each grid block may be assigned a dimension (e.g., about 2 feet by about 2 feet). The dimension may be set by default or may be configurable. Each grid block represents a discrete region of physical space in the wireless environment. Grid blocks may include one or more grid points. A grid point is a location in the grid block where a signal strength of a given RF transmitter is predicted to be observed. The predicted signal strengths may be used to determine the RF coverage of the given RF transmitter.

Coverage map 200 is a multi-level view of coverage areas in the building from the perspective of floor two. Coverage map 200 includes a graphical representation of a wireless access point (WAP) 205 and a graphical representation of a WAP 210. In one embodiment, WAP 205 is located on floor two of the office building. A coverage area 220 of WAP 205 is determined based on the predicted signal strength at various grid points on the second floor of the building. WAP 210 is located on floor four of the office building and a coverage area 230 of WAP 210 is determined based on the predicted signal strengths at various grid points on the second floor of the building. As such, coverage map 200 represents the radio coverage of wireless devices located on multiple floors of the wireless environment.

Figure 3:
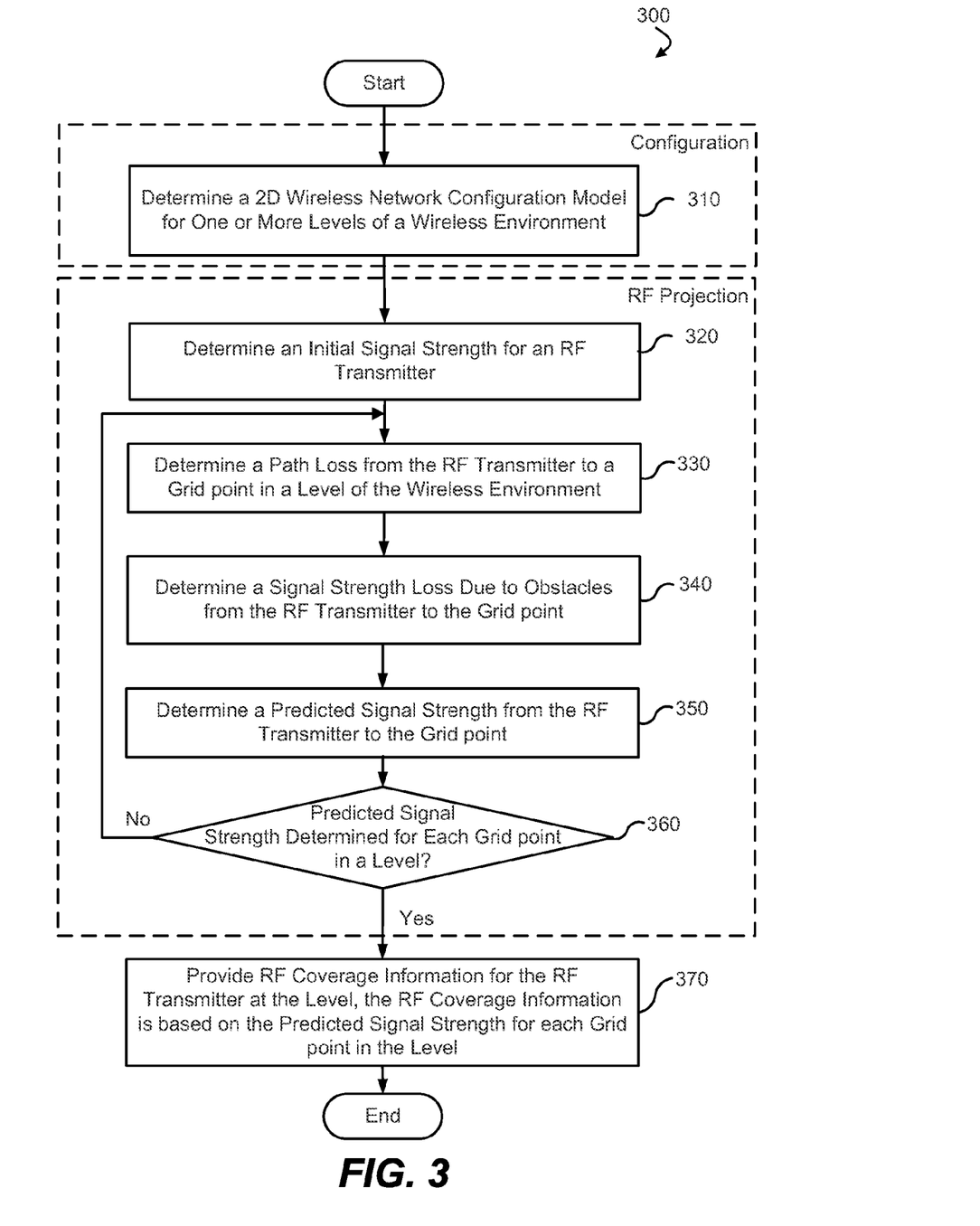
FIG. 3 is a process flow diagram for providing radio frequency coverage information in accordance with an embodiment of the invention.

FIG. 3 is a process flow diagram 300 for providing radio frequency coverage information in accordance with an embodiment of the invention. The depicted process flow 300 may be carried out by execution of one or more sequences of executable instructions. In another embodiment, the process flow 300 is carried out by components of a computer, an arrangement of hardware logic, e.g., an Application-Specific Integrated Circuit (ASIC), etc. For example, one or more steps of process flow 200 may be performed by an RF coverage map module of a network management server, end station, or other computer.

In one embodiment, a floor plan or a physical layout plan of a vertical layer in a wireless environment is configured. For example, a network administrator or other user of the RF coverage map module may build a map of the wireless environment, including a floor plan for a plurality of floors of one or more buildings. The floor plans may be described by parameters such as boundaries. One or more zones may be defined for each level. The zones may be described in 2D and/or 3D terms. Each zone may be defined by a path loss exponent for RF signals traversing through the zone. Zones may be assigned a name describing a function and/or location of a physical space in the floor plane. For example, "cafeteria," "meeting room A," "conference room North" may be used as names for zones in a workplace environment.

Moreover, a two-dimensional (2D) wireless network configuration model for one or more levels of the wireless environment are determined at step 310. The 2D configuration model for a particular level does not consider radio transmitters which are physically located at any other level. Rather, those radio transmitters which are physically located at the level being modeled (i.e., level of interest) are represented in the 2D configuration model. Various multi-level attributes of the radio transmitters and obstacles at the level being modeled are also determined, as will be more fully described with reference to FIG. 4. The multi-level attributes are attributes that characterize a three-dimensional (3D) aspect of an element in a 2D model.

A multi-level RF projection may be performed. In one embodiment, the signal coverage for all radio transmitters in the wireless environment are capable of being graphically represented in a floor-specific coverage map. The RF projection may be represented by the following well known expression:

$$S_{rp} = S_0 - [L(r,p) + W(r,p)] \quad (1)$$

In one embodiment, $S_{rp}$ is the predicted signal strength for a particular RF transmitter r at a grid point p. $S_0$ is the initial signal strength of the RF transmitter. Although various methods of determining the initial signal strength may be implemented, many methods consider the radio transmit power and the antenna of the RF transmitter to make the determination. The function $L(r,p)$ represents the path loss for the RF transmitter r at the grid point p. The function $W(r,p)$ represents the signal strength loss due to obstacles for the RF waves of the RF transmitter r to the grid point p. As used herein, path loss measures the reduction in power density (i.e., attenuation) of an electromagnetic wave as it propagates through space. At step 320, the initial signal strength for an RF transmitter in the wireless environment is determined.

At step 330, a pass loss from the RF transmitter to a grid point in a level of the wireless environment is determined. As used herein, the path loss function $L(r,p)$ measures the reduction in power density (i.e., path attenuation) of an electromagnetic wave as it propagates through space. Path loss may occur due to many effects, such as free-space loss, refraction, diffraction, reflection, loss from aperture-medium coupling, absorption, etc. Path loss may be influenced by terrain contours, environment (e.g., urban, rural, vegetation, and foliage), propagation medium (e.g., dry or moist air), the distance between the RF transmitter and a receiver, the height and location of antennas, etc.

In order to approximate the signal path loss in multi-floor environments, each level in the wireless environment which intersects a propagation pathway of an RF signal from the RF transmitter to the grid point is represented as a path loss zone. As used herein, the propagation pathway (i.e., $\overline{rp}$) of an RF signal from one RF transmitter to a grid point or a receiver is a direct line path. Further, as used herein, a path loss zone defines a path loss exponent which is used to calculate the path loss in the particular zone. Where the propagation pathway (i.e., $\overline{rp}$) crosses multiple zones, the set of zones (and path loss exponents associated therewith) is used to determine the total path loss from the RF transmitter to the grid point. Path loss is described in further detail with respect to FIG. 5.

At step 340, a signal strength loss due to obstacles from the RF transmitter to the grid point is determined. RF signals are susceptible to loss due to various obstacles, such as a lossy dielectric material. Typically, obstacles include walls, crowds of people, water, etc. As used herein, obstacles further include floors in the context of multi-level environments.

Obstacles may attenuate the RF signal. As used herein, the signal strength loss function $W(r\ p)$ due to obstacles is a measure of the attenuation of the RF signal. In order to identify an obstacle to be considered for attenuation, each obstacle which intersects the propagation pathway (i.e., $\overline{rp}$) of the RF signal from the RF transmitter to the grid point is defined by an attenuation factor. The set of attenuation factors from the obstacles which intersect the propagation pathway is used to determine the total signal strength loss. Signal strength loss due to obstacles is described in further detail with respect to FIG. 7.

At step 350, a predicted signal strength $S_{rp}$ from the RF Transmitter to the grid point is determined, for example, using the initial signal strength determined at step 320, the path loss determined at step 330, and the signal strength loss due to obstacles determined at step 340 and according to expression (1) described above.

At step 360, it is determined whether the predicted signal strength has been determined for each grid point in the level of the wireless environment for which the RF projection is being generated (i.e., level of interest). In another embodiment, the predicted signal strengths of a subset of grid points in the level of interest may be used. Where the predicted signal strengths of other grid points have not been determined, processing continues to step 330.

Otherwise, processing continues to step 370 where RF coverage information for the RF transmitter at the level of interest in the wireless environment is provided. The RF coverage information is based on the predicted signal strength for each grid point (or a subset of grid points) in the level of interest. For example, the predicted signal strength information may be used to generate a graphical representation of the coverage area of the RF transmitter from the perspective of the level of interest, such as coverage area 230 of the multi-level view coverage map 200 of FIG. 2.

Configuration

Figure 4:
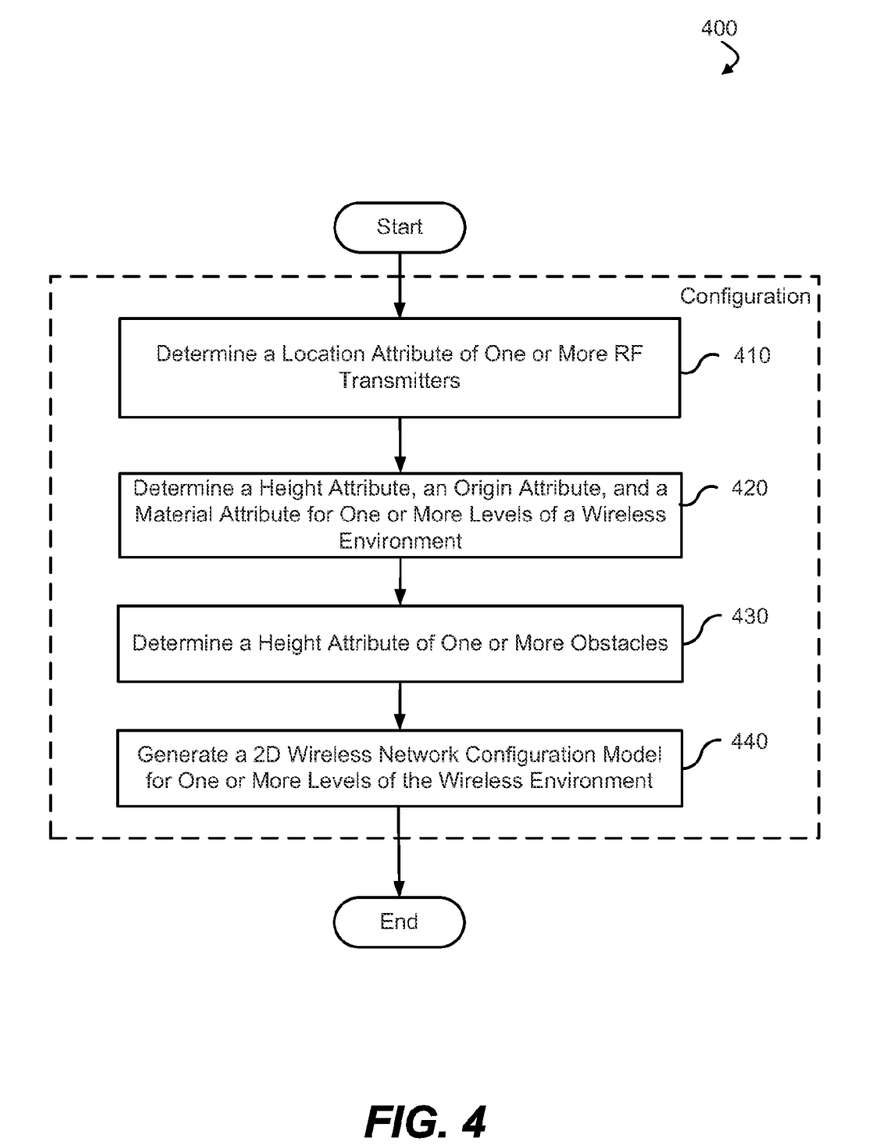
FIG. 4 is a process flow diagram for configuration of a wireless network model in accordance with an embodiment of the invention.

FIG. 4 is a process flow diagram 400 for configuration of a wireless network model in accordance with an embodiment of the invention. The depicted process flow 400 may be carried out by execution of one or more sequences of executable instructions. In another embodiment, the process flow 400 is carried out by components of a computer, an arrangement of hardware logic, e.g., an Application-Specific Integrated Circuit (ASIC), etc. For example, one or more steps of process flow 200 may be performed by an RF coverage map module of a network management server, end station, or other computer.

In one embodiment, a network administrator or other user of the RF coverage map module may configure a 2D wireless network model which may be used to generate a multi-level view coverage map. As previously described, multi-level attributes of the radio transmitters and obstacles at the level being modeled are determined.

At step 410, a location attribute of one or more RF transmitters in the wireless environment is determined. The location attribute may be defined by using three space coordinates, such as the Euclidean space coordinates (x, y, z) to represent the 3D location of an RF transmitter. The 'z' component may specify the vertical attribute relative to the floor. For example, the location attribute (x, y, 0) may be used as a coordinate at the ground (i.e., bottom) of the floor where the RF transmitter is located. The 'z' component provides greater accuracy to an RF prediction if it is configured in a wireless network model.

At step 420, a height attribute, an origin attribute, and a material attribute for one or more levels of the wireless environment are determined. Each level (e.g., floor) may be associated with a height measurement (e.g., distance between floors). The origin attribute specifies an order or origin of a floor relative to other floors. For example, the origin attribute may specify that Floor A is before Floor B, which is before Floor C. The material attribute may specify the building material of the level. The material may affect the amount of attenuation applied to an RF signal. The amount of attenuation felt by the signal as it traverses a level may be referred to herein as an attenuation factor.

At step 430, a height attribute of one or more obstacles is determined. For example, a height attribute for obstacles other than floors (e.g., walls) is determined. Instead of considering obstacles as a line (e.g., walls in a 2D plane), obstacles may be considered as planes using the height attribute of the obstacle.

A 2D wireless network configuration model for one or more levels of the wireless environment is determined at step 440. In one embodiment, the 2D configuration model and the multi-level attributes make 3D calculations possible.

Path Loss

Figure 5:
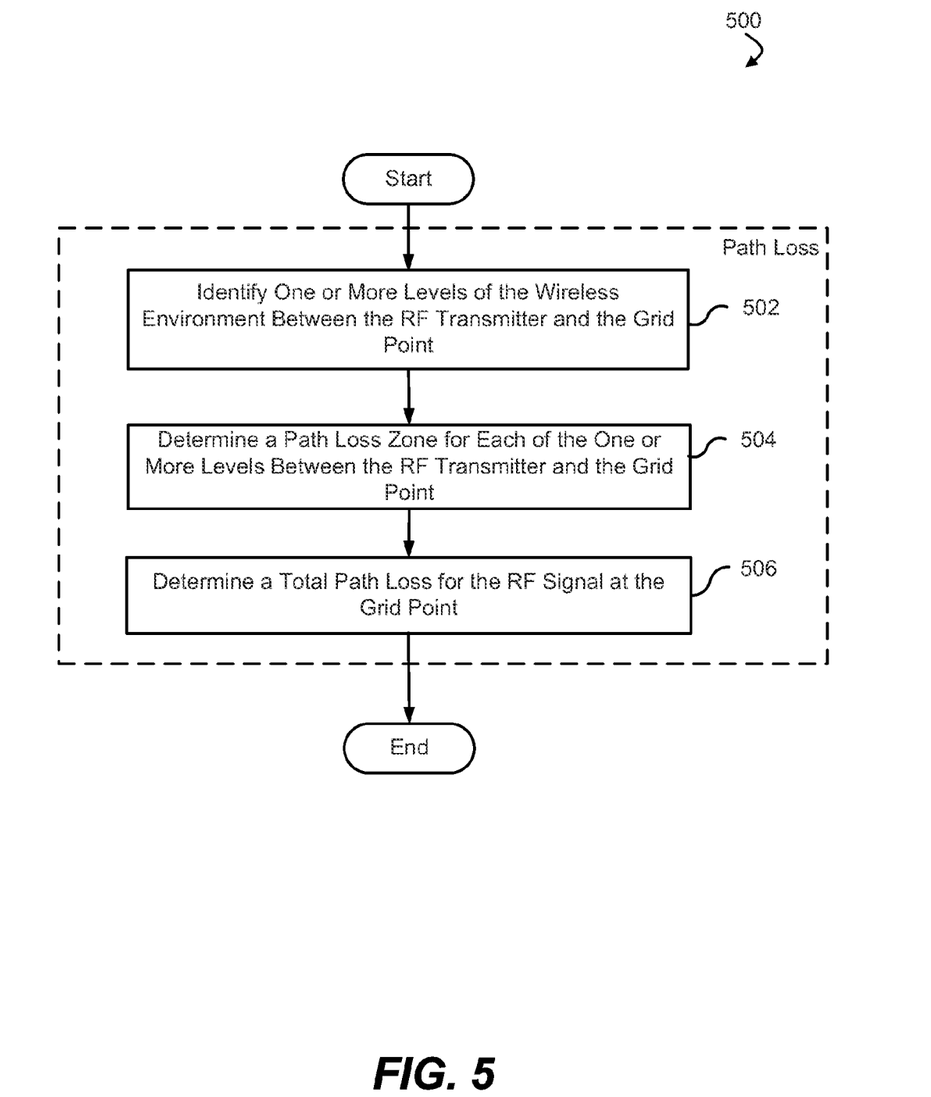
FIG. 5 is a process flow diagram for determining path loss in accordance with an embodiment of the invention.

FIG. 5 is a process flow diagram 500 for determining path loss in accordance with an embodiment of the invention. The depicted process flow 500 may be carried out by execution of one or more sequences of executable instructions. In another embodiment, the process flow 500 is carried out by components of a computer, an arrangement of hardware logic, e.g., an Application-Specific Integrated Circuit (ASIC), etc. For example, one or more steps of process flow 500 may be performed by an RF coverage map module of a network management server, end station, or other computer.

Path loss may be calculated using various techniques. One well known distance-dependent path loss expression is:

$$L = 10n \log_{10}(d) + c \quad (2)$$

In one embodiment, L is the path loss in decibels (dB), n is a path loss exponent, d is the distance between the RF transmitter and the grid point which may be measured in meters using a propagation pathway, and c is a constant which may account for system losses. The path loss exponent n may normally have a value in the range of 2-4, where a value of 2 is for propagation through free space, and a value of 4 is for lossy environments. In exceptionally lossy environments, such as large scale buildings and other indoor settings, the path loss exponent may range from 4 to 6. Generally, path loss is calculated using a variety of approximations.

In the context of multi-level environments, approximations of path loss may be performed for multiple values of path loss exponents across the propagation path of the RF signal. In one embodiment, path loss functions for each path loss exponent n may be combined. The path loss approximation with influence of multiple path loss exponents may be determined by the expression:

$$L = 10n \log_{10}(d) + \sum_{i=0}^{m-1} [10 n_i \log_{10}(d_i) - 10 n_{i+1} \log_{10}(d_i)] + c \quad (3)$$

Expression (3) may be rewritten as the following expression:

$$L = 10 \left[ n \log_{10}(d) + \sum_{i=0}^{m-1} [n_i \log_{10}(d_i) - n_{i+1} \log_{10}(d_i)] \right] + c \quad (4)$$

In one embodiment, $P = \langle p_0, \ldots, p_m \rangle$ is the set of points where the path loss exponent changes in the propagation path between the RF transmitter and grid point, where $p_i = (d_i, n_i)$, $d_i$ is the distance where the path loss exponent changes, and $n_i$ is the path loss exponent in the range $[d_i-1, d_i)$ for $i>0$, $[0, d_0]$ for $p_0$. Moreover, $d_i < d_i + 1$, $n_o$ is the initial path loss exponent (e.g., the zone where the RF transmitter is physically located), and $p_m = (d_m, n_m) = (d, n)$ is the path loss exponent for the grid point location (e.g., the zone where the grid point or receiver is physically located).

At step 502, one or more levels of the wireless environment between the RF transmitter and the grid point in the level of interest is determined. Each level which intersects the propagation pathway is determined.

At step 504, a path loss zone for each of the one or more levels between the RF transmitter and the grid point is determined. As previously described, one or more zones may be defined for each level. In the context of 2D zones, at each point the propagation pathway intersects with a level, the propagation pathway also intersects with at least one zone. In one embodiment, each zone which is intersected by the propagation pathway is represented in a path loss 2D model.

A distance $d_i$ (i.e., point in the propagation pathway) at which there is a change in zones is determined. This distance $d_i$ (e.g., $d_0$, $d_1$) can be seen as an inflection point in the propagation pathway indicating a change from one zone to another, i.e., a change in one path loss exponent to another. A propagation pathway may have any number of distances $d_i$ (where $0 \geq i$) associated therewith.

Furthermore, a path loss exponent $n_i$ defined by each of the path loss zones is determined. A path loss exponent $n_i$ defined by a zone on a particular level is used in the calculation of the predicted path loss for the space between that level and the next. A distance p where the grid point is located is also determined.

At step 506, the total path loss for the RF signal at the grid point is determined, for example, based on the path loss zones and expression (4) as described above.

Figure 6A:
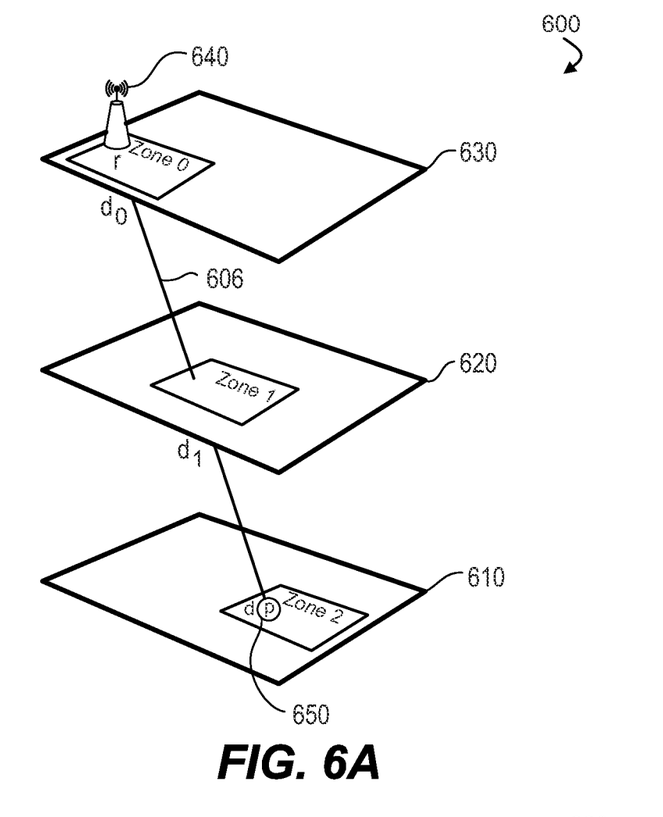
FIG. 6A is a block diagram of a multi-level WLAN deployment in accordance with an embodiment of the invention.

FIG. 6A is a block diagram of a multi-level WLAN deployment in accordance with an embodiment of the invention. A wireless environment 600 may include a ground-level floor 610, a middle-level floor 620, and a rooftop-level floor 630. The arrangement of the floors relative to each other may be determined by the origin attribute of each floor, as specified, for example, during configuration of wireless environment 600. Wireless environment 600 includes a WAP 640 physically located on floor 630. WAP 640 includes an RF transmitter. The physical location of WAP 640 may be determined from the location attribute of WAP 640 as specified, for example, during configuration. A signal path loss from WAP 640 to a grid point 650 located on floor 610 is determined. The path loss calculation may consider a propagation pathway 606 of the RF signal from the RF transmitter of WAP 640 to grid point 650. Each level (e.g., floor) which intersects propagation pathway 606 is determined. As shown, propagation pathway 606 intersects with floor 630 and floor 620.

Path loss zones are determined. At each point propagation pathway 606 intersects with a level, propagation pathway 606 also intersects with at least one zone. For example, propagation pathway intersects with zone 0 of floor 630, zone 1 of floor 620, and zone 2 of floor 610.

Since each zone is defined by a path loss exponent, the path loss exponents $n_i$ for zone 0 and zone 1 are determined. A distance p where grid point 650 is located is also determined. Moreover, the distances $d_i$ (i.e., points in the propagation pathway) at which there is a change in zones are determined. A change from zone 0 to zone 1 occurs at distance $d_0$ which corresponds to the bottom boundary of floor 630. A change from zone 1 to zone 2 occurs at distance $d_1$ which corresponds to the bottom boundary of floor 620.

In one embodiment, the distances d, are set on the floor limits assuming the height of the zone is the same as the height of the floor or level. In other words, a path loss exponent defined by zone 1 on floor 620 is used to determine the path loss in all the space between floor 620 and floor 630. The height may be determined, for example, by the height attribute of the level as specified during configuration.

Figure 6B:
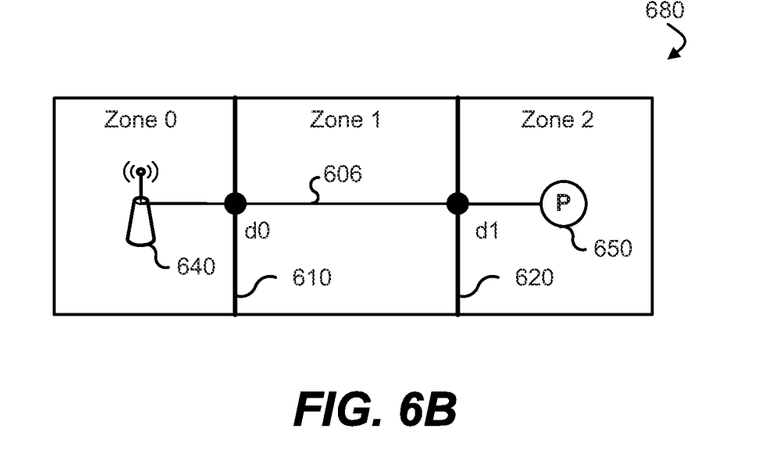
FIG. 6B is a block diagram of a logical 2D model of path loss in a multi-level WLAN deployment in accordance with an embodiment of the invention.

FIG. 6B is a block diagram of a logical 2D model 680 of path loss in a multi-level WLAN deployment in accordance with an embodiment of the invention.

In one embodiment, logical 2D model 680 of path loss (hereinafter, "model 680") is based on wireless environment 600 of FIG. 6A. Model 680 includes three path loss zones:

zone 0 of floor 630, zone 1 of floor 620, and zone 2 of floor 610. Propagation path 606 from the RF transmitter of WAP 640 to grid point 650 is determined. A distance p where grid point 650 is located is also determined.

Moreover, the distance $d_0$ is the point in propagation path 606 at which there is a change from zone 0 to zone 1. Likewise, the distance $d_1$ is the point in propagation path 606 at which there is a change from zone 1 to zone 2. The total path loss along propagation path 606 may be predicted based on model 680 and according to expression (4) as described above.

Signal Strength Loss Due to Obstacles

Figure 7:
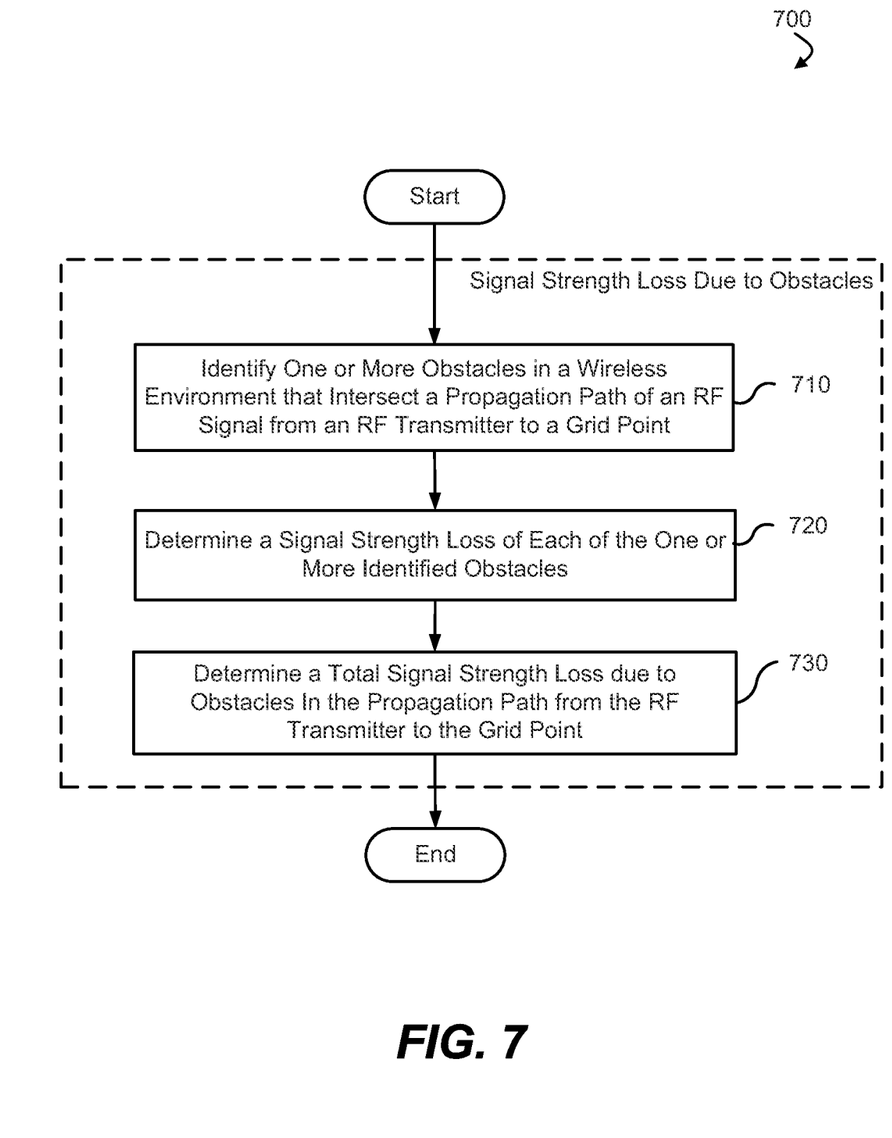
FIG. 7 is a process flow diagram for determining signal strength loss in accordance with an embodiment of the invention.

FIG. 7 is a process flow diagram for determining signal strength loss in accordance with an embodiment of the invention. The depicted process flow 700 may be carried out by execution of one or more sequences of executable instructions. In another embodiment, the process flow 700 is carried out by components of a computer, an arrangement of hardware logic, e.g., an Application-Specific Integrated Circuit (ASIC), etc. For example, one or more steps of process flow 700 may be performed by an RF coverage map module of a network management server, end station, or other computer.

As previously described, obstacles may attenuate an RF signal. The signal strength loss function W(r, p) may be calculated using various techniques. Regardless of the particular function used, the identification of obstacles for signal attenuation calculations in the context of multi-level environments may be performed.

At step 710, one or more obstacles in a wireless environment that intersect a propagation path of an RF signal from an RF transmitter to a grid point is determined. As used herein, obstacles include walls, floors, landscape artifacts such as trees and bushes, bodies of water, etc. In typical 2D wireless network models, an obstacle is represented as a line. As described herein, an obstacle, such as a wall, is represented and visualized in the 2D wireless network model as a line. However, the obstacle may be used as a plane in a 3D model, for example, to determine if the obstacle intersects the propagation pathway (i.e., $\overline{rp}$). It should be mentioned that any 3D model or representation is used for predicted RF coverage calculations and is not rendered, for example as a graphical visualization in a coverage map. In other embodiments, obstacles such as trees may be represented in a 3D model in terms of volume. The planar characteristics and/or characteristics describing volume may be determined by the height attribute of each obstacle, as specified, for example, during configuration of the wireless environment. Representation of certain obstacles as planar objects or in terms of volume aids in the determination of whether the obstacle intersects the propagation path.

At step 720, a signal strength loss of each of the one or more identified obstacles is determined. In one embodiment, attenuation factors for the identified obstacles are determined. Where the obstacle is a floor, the attenuation factor of the floor may be determined using the material attribute of the particular floor, for example, as specified during configuration.

At step 730, a total signal strength loss due to obstacles in the propagation path is determined. The total signal strength loss may be based on the attenuation factors for each of the identified obstacles. Various functions that consider all obstacles may be used to determine the signal strength loss. The W(r, p) function is one which considers a summation of the attenuation factors for each identified obstacle. For example, the W(r,p) function may be represented by the following expression:

$$W(r, p) = \sum_{l \in obstacles} attenuation_l \qquad (5)$$

In one embodiment, obstacles are all the obstacles that intersect the propagation pathway (i.e., $\overline{rp}$).

Figure 8A:
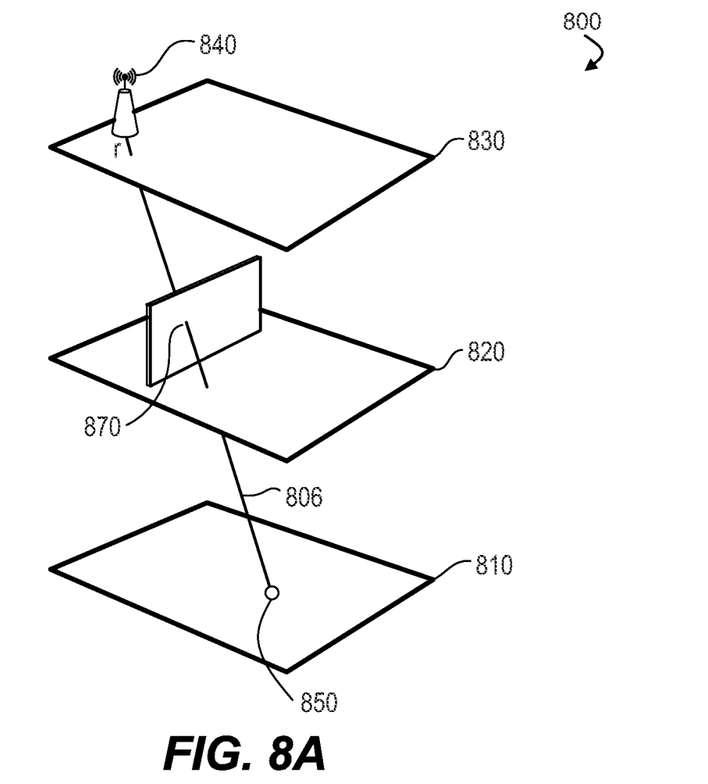
FIG. 8A is another block diagram of a multi-level WLAN deployment in accordance with an embodiment of the invention.

FIG. 8A is another block diagram of a multi-level WLAN deployment in accordance with an embodiment of the invention. A wireless environment 800 may include a ground-level floor 810, a middle-level floor 820, and a rooftop-level floor 830. Various elements in wireless environment 800 may be modeled as planes. For example, wall 870 is modeled as a planar object.

Wireless environment 800 includes a WAP 840 physically located on floor 830. WAP 840 includes an RF transmitter. A signal strength loss from WAP 840 to a grid point 850 located on floor 810 is determined. The strength loss calculation may consider a propagation pathway 806 between the RF transmitter of WAP 840 and the grid point 850. Each obstacle (e.g., floor, wall, etc.) that intersects propagation pathway 806 is determined. As shown, propagation pathway 806 intersects with floor 830, wall 870, followed by floor 820.

Attenuation factors for the identified obstacles may be determined. The attenuation factor in decibels (dB) for floor 830 may be 2 dB, concrete wall 870 may be 15 dB, and floor 820 may be another 2 dB.

The attenuation factors may be used to determine a total signal strength loss. The total signal strength loss function W(r,p) may be determined by a summation of the attenuation factors. For example, W(r,p) may be 19 dB for the wireless environment 800.

Figure 8B:
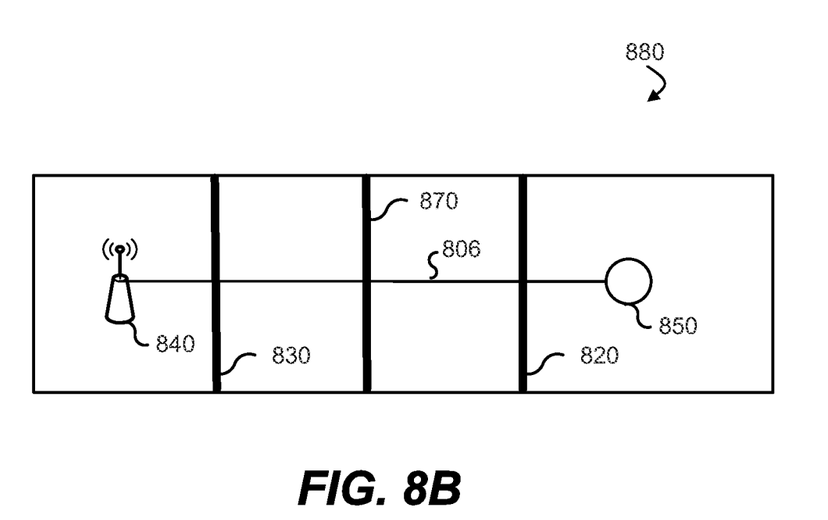
FIG. 8B is a block diagram of a logical 2D model of signal strength loss in a multi-level WLAN deployment in accordance with an embodiment of the invention.

FIG. 8B is a block diagram of a logical 2D model 880 of signal strength loss in a multi-level WLAN deployment in accordance with an embodiment of the invention.

In one embodiment, logical 2D model 880 of signal strength loss (hereinafter, "strength loss model 880") is based on wireless environment 800 of FIG. 8A. Strength loss model 880 includes a representation of propagation path 806 of an RF signal from the RF transmitter of WAP 840 to grid point 850. In one embodiment, the planar obstacles which intersect propagation path are identified. In particular, obstacles floor 830, wall 870, and floor 820 are identified and represented in strength loss model 880.

Figure 9:
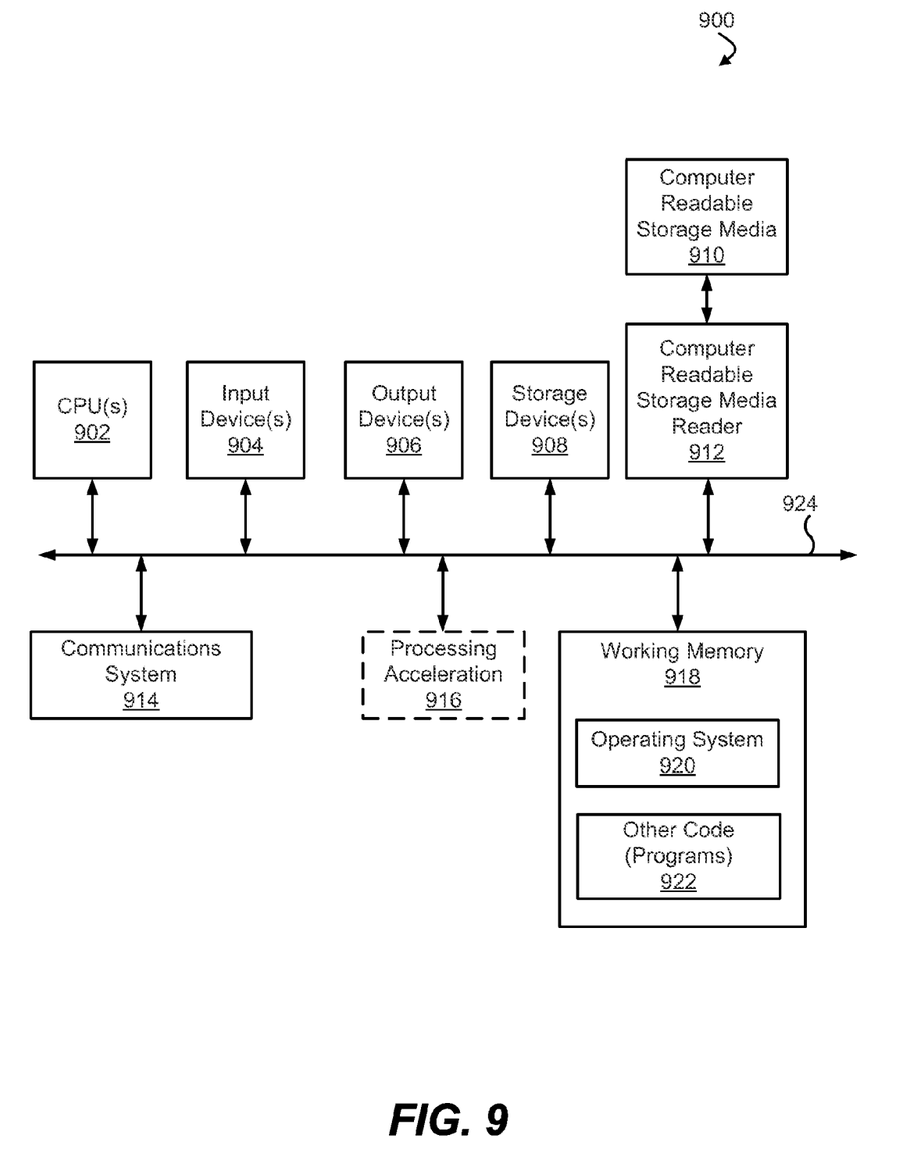
FIG. 9 illustrates an exemplary computer system in which various embodiments of the present invention may be implemented.

FIG. 9 illustrates an exemplary computer system 900 in which various embodiments of the present invention may be implemented. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc.), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and in combination with storage device(s) 908 in one embodiment) comprehensively representing remote, local, fixed, and/or removable storage devices plus storage media for temporarily and/or more permanently containing, storing, transmitting, and retrieving computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for predicting radio frequency (RF) coverage in a multi-level wireless network, the multi-level wireless network including a plurality of wireless devices, each of the wireless devices of the plurality of wireless devices including an RF transmitter, the method comprising:
    determining, by a network management server, a two-dimensional wireless network configuration model of a vertical level of the multi-level wireless network, wherein determining the two-dimensional wireless network configuration model of the vertical level includes determining a location attribute of one or more RF transmitters in the multi-level wireless network that are physically located at the vertical level;
    determining a path loss in a propagation path of an RF signal from an RF transmitter of a wireless device of the plurality of wireless devices to a grid point in the vertical level, wherein the path loss is based on a plurality of path loss exponents;
    determining a signal strength loss at the grid point due to one or more obstacles intersecting the propagation path; and
    predicting a strength of the RF signal at the grid point based on the path loss and the signal strength loss.

2. The method of claim 1, wherein determining the two-dimensional wireless network configuration model of the vertical level further comprises determining an origin attribute of the vertical level relative to other vertical levels of the multi-level wireless network.

3. The method of claim 1, wherein determining the two-dimensional wireless network configuration model of the vertical level further comprises determining a height attribute of one or more obstacles in the vertical level.

4. The method of claim 1, wherein determining the path loss comprises:
    identifying one or more vertical levels of the multi-level wireless network that intersect the propagation path;
    determining a path loss exponent for each of the one or more vertical levels identified;
    determining one or more distances in the propagation pathway that indicate a change in path loss exponents; and
    calculating the path loss based on the path loss exponent for each of the one or more vertical levels and the one or more distances in the propagation pathway.

5. The method of claim 1, wherein determining a signal strength loss comprises:
    identifying the one or more obstacles, wherein at least one obstacle of the one or more obstacles is a floor;
    determining an attenuation factor for each of the one or more obstacles; and
    calculating the signal strength loss based on the attenuation factor for each of the one or more obstacles.

6. The method of claim 1, wherein an obstacle of the one or more obstacles is a wall, and wherein the wall is represented as a planar object for the determination of the signal strength loss.

7. The method of claim 1, further comprising:
    dividing a floor plan of the vertical level of the multi-level wireless network according to a plurality of grid blocks; and
    determining one or more grid points in each of the grid blocks.

8. The method of claim 1, further comprising:
    determining a coverage area of the RF transmitter based on the predicted strength, wherein the coverage area spans a plurality of vertical levels of the multi-level wireless network; and providing a graphical representation of the coverage area of the RF transmitter.

9. The method of claim 1, wherein the predicted strength of the RF signal is an initial strength of the RF signal reduced by the path loss and the signal strength loss.

10. A non-transitory computer-readable medium storing a plurality of instructions for controlling a data processor to predict radio frequency (RF) coverage in a multi-level wireless network, the multi-level wireless network including a plurality of wireless devices, each of the wireless devices of the plurality of wireless devices including an RF transmitter, the plurality of instructions comprising code that when executed by a processor is to:
   determine a two-dimensional wireless network configuration model of a vertical level of the multi-level wireless network, wherein the code to determine the two-dimensional wireless network configuration model of the vertical level includes code to determine a location attribute of one or more RF transmitters in the multi-level wireless network that are physically located at the vertical level;
   determine a path loss in a propagation path of an RF signal from an RF transmitter of a wireless device of the plurality of wireless devices to a grid point in the vertical level, wherein the path loss is based on a plurality of path loss exponents;
   determine a signal strength loss at the grid point due to one or more obstacles intersecting the propagation path; and
   predict a strength of the RF signal at the grid point based on the path loss and the signal strength loss.

11. The non-transitory computer-readable medium of claim 10, wherein the code to determine the path loss is further to:
   identify one or more vertical levels of the multi-level wireless network that intersect the propagation path;
   determine a path loss exponent for each of the one or more vertical levels identified;
   determine one or more distances in the propagation pathway that indicate a change in path loss exponents; and
   calculate the path loss based on the path loss exponent for each of the one or more vertical levels and the one or more distances in the propagation pathway.

12. The non-transitory computer-readable medium of claim 10, wherein the code to determine the signal strength loss is further to:
   identify the one or more obstacles, wherein at least one obstacle of the one or more obstacles is a floor;
   determine an attenuation factor for each of the one or more obstacles; and
   calculate the signal strength loss based on the attenuation factor for each of the one or more obstacles.

13. The non-transitory computer-readable medium of claim 10, wherein an obstacle of the one or more obstacles is a wall, and wherein the wall is represented as a planar object for the determination of the signal strength loss.

14. The non-transitory computer-readable medium of claim 10, wherein code to determine the two-dimensional wireless network configuration model of the vertical level is further to determine an origin attribute of the vertical level relative to other vertical levels of the multi-level wireless network.

15. A system for predicting radio frequency (RF) coverage in a multi-level wireless network, the multi-level wireless network including a plurality of wireless devices, each of the wireless devices of the plurality of wireless devices including an RF transmitter, the system comprising:
   a processor; and
   a memory coupled to the processor, the memory to store a two-dimensional wireless network configuration model of a vertical level of the multi-level wireless network, wherein the two-dimensional wireless network configuration model of the vertical level is determined based on a location attribute of one or more RF transmitters in the multi-level wireless network that are physically located at the vertical level;
   wherein the processor is to:
      determine a path loss in a propagation path of an RF signal from an RF transmitter of a wireless device of the plurality of wireless devices to a grid point in the vertical level, wherein the path loss is based on a plurality of path loss exponents;
      determine a signal strength loss at the grid point due to one or more obstacles intersecting the propagation path; and
      predict a strength of the RF signal at the grid point based on the path loss and the signal strength loss.

16. The system of claim 15 wherein, to determine the path loss, the processor is further to:
   identify one or more vertical levels of the multi-level wireless network that intersect the propagation path;
   determine a path loss exponent configured for each of the one or more vertical levels identified;
   determine one or more distances in the propagation pathway that indicate a change in path loss exponents; and
   calculate the path loss based on the path loss exponent for each of the one or more vertical levels and the one or more distances in the propagation pathway.

17. The system of claim 15 wherein, to determine the signal strength loss, the processor is further to:
   identify the one or more obstacles, wherein at least one obstacle of the one or more obstacles is a floor;
   determine an attenuation factor for each of the one or more obstacles; and
   calculate the signal strength loss based on the attenuation factor for each of the one or more obstacles.

18. The system of claim 15, wherein an obstacle of the one or more obstacles is a wall, and wherein the wall is represented as a planar object for the determination of the signal strength loss.

19. The system of claim 15, wherein the processor is further to determine the two-dimensional wireless network configuration model of the vertical level based on an origin attribute of the vertical level relative to other vertical levels of the multi-level wireless network.

* * * * *

UNITED STATES PATENT AND TRADEMARK OFFICE
CERTIFICATE OF CORRECTION

PATENT NO. : 8,442,552 B2
APPLICATION NO. : 12/766520
DATED : May 14, 2013
INVENTOR(S) : Fabiel Zuniga Gallegos It is certified that error appears in the above-identified patent and that said Letters Patent is hereby corrected as shown below:

In the Claims

In column 13, line 57, in Claim 14, delete "wherein" and insert -- wherein the --, therefor.

Signed and Sealed this
Seventeenth Day of September, 2013

Teresa Stanek Rea
*Deputy Director of the United States Patent and Trademark Office*